US012746803B2

(12) United States Patent
Schreiber et al.

(10) Patent No.: US 12,746,803 B2
(45) Date of Patent: Sep. 29, 2026

(54) FIXED ROOF ELEMENT FOR A VEHICLE ROOF, COMPRISING A GUIDE RAIL OR OTHER ELEMENT OF A SHADING SYSTEM

(71) Applicant: Webasto SE, Stockdorf (DE)

(72) Inventors: Ulrich Schreiber, Stockdorf (DE); Julian Knöpfle, Stockdorf (DE); Ludwig Stigler, Stockdorf (DE); Johann Lang, Stockdorf (DE); Maciej Kaczmarek, Stockdorf (DE); Moritz Pradella, Stockdorf (DE); Eva Huttner, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 357 days.

(21) Appl. No.: 18/564,948

(22) PCT Filed: May 30, 2022

(86) PCT No.: PCT/EP2022/064608
§ 371 (c)(1),
(2) Date: Nov. 28, 2023

(87) PCT Pub. No.: WO2022/253754
PCT Pub. Date: Dec. 8, 2022

(65) Prior Publication Data

US 2024/0239161 A1 Jul. 18, 2024

(30) Foreign Application Priority Data

May 31, 2021 (DE) ..................... 10 2021 114 030.7

(51) Int. Cl.
*B60J 7/00* (2006.01)

(52) U.S. Cl.
CPC ........... *B60J 7/0007* (2013.01); *B60J 7/0015* (2013.01)

(58) Field of Classification Search
CPC ........ B60J 7/0007; B60J 7/0015; B60J 7/043; B60J 7/047
(Continued)

(56) References Cited

U.S. PATENT DOCUMENTS 4,802,707 A * 2/1989 Schlapp .................... B60J 7/053 296/222
8,002,342 B2 * 8/2011 Uehara .................. B60J 7/0015 296/217
(Continued)

FOREIGN PATENT DOCUMENTS

CN 201258134 Y 6/2009
DE 1480500 A1 10/1969
(Continued)

OTHER PUBLICATIONS

IPRP issued in corresponding PCT/EP2022/064608; dated Nov. 21, 2023; in English (7 pages).
(Continued)

*Primary Examiner* — Jason S Daniels
(74) *Attorney, Agent, or Firm* — Fitch, Even, Tabin & Flannery, LLP

(57) ABSTRACT

A fixed roof element for a vehicle roof, said fixed roof element having a panel to the underside of which at least one guide rail of a shading system is joined via a plastic moulded portion. The plastic moulded portion receives a clamping unit, which keeps the guide rail at the panel and which is formed by at least one insert part of the plastic moulded portion.

18 Claims, 9 Drawing Sheets

(58) Field of Classification Search
USPC ........................................... 296/214, 216.01
See application file for complete search history.

(56) References Cited

U.S. PATENT DOCUMENTS

| | | | | |
|---|---|---|---|---|
| 11,807,088 | B2 * | 11/2023 | Albers | B60J 7/057 |
| 2002/0113466 | A1 * | 8/2002 | Bohm | B60J 7/00 296/216.09 |
| 2002/0125743 | A1 | 9/2002 | Bohm | |
| 2011/0221237 | A1 | 9/2011 | Nakamura | |
| 2014/0049076 | A1 * | 2/2014 | Roeder | B29C 41/20 264/255 |
| 2015/0137562 | A1 * | 5/2015 | Hirvonen | B60J 7/02 296/214 |
| 2018/0162207 | A1 | 6/2018 | Pike | |
| 2024/0010059 | A1 * | 1/2024 | Knöpfle | B60J 7/1642 |

FOREIGN PATENT DOCUMENTS

| | | | |
|---|---|---|---|
| DE | 29820613 | U1 | 3/2000 |
| DE | 102005057741 | A1 | 6/2007 |
| DE | 102010048257 | A1 | 4/2012 |
| DE | 102012003045 | A1 | 8/2013 |
| DE | 102014005476 | A1 | 10/2015 |
| DE | 102015109862 | A1 | 12/2016 |
| DE | 102019126312 | A1 | 4/2021 |
| KR | 20110043765 | A | 4/2011 |
| WO | 2020015907 | A1 | 1/2020 |

OTHER PUBLICATIONS

Office Action issued in corresponding German Application No. 10 2021 114 030.7; dated Jan. 26, 2024; in German with English Translation (6 pages).
Office Action issued against corresponding German Application No. 10 2021 114 030.7; mailed Jan. 7, 2022; in German with English Translation (10 pages).
ISR issued against corresponding PCT/EP2022/064608; mailed Sep. 14, 2022; in German with English Translation (5 pages).
Office Action issued in corresponding Chinese Application No. 202280047540.8; mailed Mar. 28, 2026; in Chinese with English machine translation (18 pages). Two references previosuly cited in a previous IDS.

* cited by examiner

FIXED ROOF ELEMENT FOR A VEHICLE ROOF, COMPRISING A GUIDE RAIL OR OTHER ELEMENT OF A SHADING SYSTEM

CROSS-REFERENCE TO RELATED APPLICATIONS

This application is a U.S. national phase application filed under 35 U.S.C. § 371 of International Application No. PCT/EP2022/064608, filed on May 30, 2022, published under WO 2022/253754A1 on Dec. 8, 2022, designating the United States, which claims priority from German Patent Application Number 10 2021 114 030.7, filed on May 31, 2021, which are hereby incorporated herein by reference in their entirety.

FIELD

The invention relates to a fixed roof element for a vehicle roof, said fixed roof element comprising the features of the preamble of claim 1.

BACKGROUND

Such a fixed roof element is known from document WO 2020/015907 A1 and constitutes a roof element which is a component of a so-called panoramic roof and is mounted in a rigid or immobile way with respect to a vehicle body. Said fixed roof element comprises a flat (or flush or plane or two-dimensional) panel, which is formed by a glass panel and forms a roof body shell element. Moulded portions are formed on the underside of the glass panel, said moulded portions being formed in a foam moulding process or an injection-moulding process and each having a groove-like recess for an upper-side rib of a guide rail. In a manner not illustrated, the shading system of the fixed roof element 14' illustrated in FIGS. 14 to 17 includes a drive arrangement, which comprises two drive cables driven by a common drive motor which is joined to the underside of the roof shell element 16 in the front of the see-through area, which serves to guide lateral edges of a roller blind web for shading the vehicle interior. The guide rails are realised as extruded aluminium profiles. By forming the ribs on the upper side of the guide rails, the guide rails extend deep into the vehicle interior from the glass panel, which is detrimental to the headroom of passengers.

SUMMARY

The object of the invention is to create a fixed roof element which is of the kind mentioned in the introduction and makes it possible to join a guide rail to the underside of the panel in an installation space-saving way.

This object is attained in accordance with the invention by the fixed roof element having the features of claim 1.

In accordance with the invention, a fixed roof element for a vehicle roof is thus proposed, said fixed roof element comprising a panel to the underside of which at least one guide rail of a shading system is joined via a plastic moulded portion. Said plastic moulded portion receives a clamping unit, which keeps the guide rail at the panel and which is formed by at least one insert part of the plastic moulded portion.

By means of the clamping unit, an instrument is thus integrated into the plastic moulded portion which makes it possible to connect the guide rail to the panel or to keep it at the panel and which is able to reach around the guide rail on opposite flanks. The term clamping unit implies that portions thereof reach around the guide rail at its flanks, said portions in particular being resilient. Consequently, the clamping unit exerts a holding force, which acts in the transverse direction of the guide rail. When installing the guide rail, assemblers can manually make sure that the guide rail engages with the clamping unit. Screwing processes or the same for joining the guide rail to the underside of the panel are not required. The guide rail can quickly be installed after the plastic moulded portion has been formed, which receives the clamping unit as insert part(s). It can be installed during the cooling time after the moulding process outside of the moulding tool by means of which the moulded portion is produced. Consequently, short tool open times and fast production cycles can be realised. Since the guide rail is installed outside of the open and heated moulding tool, assemblers who install the guide rail are also safer.

The clamping unit can have a simple geometry so that a simple tool concept for integrating the clamping unit into the plastic moulded portion is also possible.

The plastic moulded portion can receive or be injection-moulded or foamed around the clamping unit in its entirety or the clamping unit can also protrude from the plastic moulded portion in part.

The clamping unit makes it possible to position the guide rail at the panel in a precise and reproducible way so that it can also be guaranteed that the guide rail has a precise interface with a neighbouring component.

The guide rail, which is held by the clamping unit, can have a low installation height so that the leverage forces which are acted upon the guide rail by the shading system are low. The risk of a deformation and compression of the guide rail is consequently low.

Forces which act upon the guide rail can be directly introduced into the panel via the clamping unit and the moulded portion. Since bolt flanges or the like are not required for joining the guide rail to the panel, lever arms upon which the forces act are short. This can in turn prevent any damage to the moulded portion and/or the panel or also deformations and sluggishnesses, which go hand in hand with the deformations upon operation of the shading system and also acoustic issues.

In a special embodiment of the fixed roof element according to the invention, the clamping unit has at least one clamping element, which includes a plate portion and at least one angled portion, which is preferably resilient and is an angled tab with respect to the plate portion and acts on a side surface or flank of the guide rail. The surface area or upper side of the guide rail is then substantially parallel to the plate portion of the clamping element. The resilient angled portion acts the holding force on the guide rail in the transverse direction.

The clamping element preferably comprises two angled portions, which are disposed on opposite sides and reach around the guide rail on opposite flanks or sides. The two angled portions can be offset from each other in the longitudinal direction of the guide rail.

It is also conceivable that multiple clamping elements are provided, which each only have a tab-like angled portion and directly rest against the guide rail or above the plastic moulded portion on opposite flanks.

In a special embodiment of the fixed roof element according to the invention, the clamping element has two angled portions, which are each formed in the manner of a tab and reach around the guide rail on opposite sides or flanks, and only one of the two angled portions is designed as an elastic element, whereas the other angled portion is configured as a rigid and mostly form-fitting element, which establishes a lock in the back in the direction of the main load. This angled portion is preferably the angled portion which rests against the inner side of the guide rail and which faces towards a shading element of the shading system. Forces which act in the vertical direction of the roof can consequently be absorbed in the best possible way. Simultaneously, high holding forces can be made available. By designing the angled portion which is disposed on the outer side to be elastic, installing the guide rail is nonetheless easy.

In order to prevent the angled portions of the clamping elements or of the clamping element from influencing the course of the guide rail on the underside of the panel, the at least one angled portion of the clamping element only has a length of approximately 10 mm to 30 mm in the longitudinal direction of the guide rail.

In order to be able to join the guide rail to the panel over its surface, the clamping unit, in a preferred embodiment of the fixed roof element according to the invention, comprises multiple clamping elements, which are disposed in such a way that they are spaced apart from each other in the longitudinal direction of the guide rail and which preferably have a distance of approximately 150 mm to 300 mm between each other. Consequently, the clamping elements can determine the course of the guide rail on the underside of the panel.

In a preferred embodiment of the fixed roof element according to the invention, the guide rail is an extruded plastic part, which is produced from piece goods which are initially unbent. Due to the deformability of the plastic material or its flexibility, the course and orientation of the plastic rail in relation to the panel can be determined by the clamping unit, which keeps the guide rail at the panel. Consequently, it is, for example, also possible that the clamping unit defines a substantially parallel orientation of the surface of the guide rail or also a horizontal orientation of the guide rail on the underside of the panel, which in turn makes packaging the guide rail on the vehicle roof in an installation space-saving way possible. This is not possible with the extruded profiles made of aluminium which have been used hitherto since they are very stiff. In particular, the extruded plastic part can also be bent in two directions, thus following a two-dimensional curvature of the panel.

In order to improve the sliding properties of the guide rail of the fixed roof element according to the invention, the guide rail can be a two-component extruded plastic part. The two components can be joined together in a coextrusion process, wherein one component, which is selected as the optimum with respect to the sliding properties with respect to the friction partner, which is guided in the guide channels, forms the surfaces of guide channels of the guide rail.

In order to further reduce the installation height of the shading system on the underside of the panel, the guide rail of the fixed roof element according to the invention can for example have a nearly trapezoidal cross-section. A base of the cross-section is preferably parallel to the plate portion of the clamping unit, said plate portion being received by the plastic moulded portion parallel to the panel or also under a defined angle with respect to the panel.

In order to prevent the guide rail from making rattling noises during operation of the relevant vehicle, it may be advantageous if the plastic moulded portion at least widely extends over the length of the guide rail and if the guide rail continuously rests against the plastic moulded portion in the longitudinal direction.

In order to prevent the guide rail from getting out of place with respect to the panel in the longitudinal direction of the guide rail, a fixing unit can be provided, which keeps the guide rail in position with respect to the panel in the longitudinal direction. The fixing unit can for example be realised by thorns or the like, which are either formed at the clamping unit or also at the plastic moulded portion and grip into the plastic of the guide rail. The fixing unit, which defines a fixed bearing point of the guide rail, allows for an otherwise floating bearing or a fixed-loose bearing of the guide rail so that it is possible to compensate for the different thermal expansion behaviour of the panel, which can in particular be formed by a glass component, and of the plastic of the guide rail. Consequently, axial twisting of the guide rail can be avoided, which could lead to an undesired deformation or an undesired curvature of the panel. In order to realise the fixed bearing point or the fixing unit, it is also possible to form an anchor point at the plastic moulded portion, said anchor point corresponding with a milled groove, borehole or the like of the guide rail.

The plastic moulded portion of the fixed roof element according to the invention, which forms the clamping unit at the panel, is preferably produced from a polyurethane foam material and moulded to the panel in a foam moulding or injection-moulding process.

In a preferred embodiment, the panel itself is a glass panel from a toughened safety glass or a laminated safety glass. As an alternative, the panel can also be produced from a plastic material such as a polycarbonate material.

In another special embodiment of the fixed roof element according to the invention, the clamping unit comprises a plastic element, on which clamping ribs are formed, on which the guide rail is locked. The plastic element is in particular an injection-moulding component, on the underside of which the clamping ribs are disposed, said clamping ribs laterally resting against corresponding flanks or ribs of the relevant guide rail.

The plastic element forms an insert part of the plastic moulded portion, which can be formed from a plastic foam material so that the plastic element, which is formed in the manner of a clip, is foam moulded to the panel.

The plastic element can comprise a base plate, which is substantially parallel or plane-parallel with respect to the panel. The base plate can be closed or also be formed like a frame. When joining or foam moulding the plastic element to the panel, a simple circumferential seal is possible in the relevant moulding tool so that the moulding material, which can be formed from polyurethane, can be prevented from leaking.

In the moulding tool for joining the plastic element to the panel, no slides have to be used since the main demoulding can substantially take place parallel to the opening direction of the tool.

In a special embodiment, the plastic element includes anchor ribs on its upper side, said anchor ribs being embedded into the plastic moulded portion. The anchor ribs also make it possible to exert uniform pressure upon the panel when joining the plastic element to the panel in the relevant moulding tool.

In order to realise a clearly defined position of the guide rail at the plastic element, a supporting rib, in an advantageous embodiment, is formed on an underside of the base plate, an upper-side counter-rib of the guide rail resting against said supporting rib, in particular laterally.

It is conceivable that the plastic element is substantially rigid in shape. In particular in this case, it is advantageous if the guide rail comprises an elastic locking rib, which interacts with the clamping unit or the plastic element. The elastic locking rib can be formed by a free leg of a lateral portion of the guide rail, which is in particular produced from plastic, said lateral portion substantially being U-shaped.

The invention also relates to a fixed roof element for a vehicle roof, said fixed roof element comprising a panel to the underside of which at least one element of a shading system is joined via a plastic moulded portion. Said plastic moulded portion receives a support component, at which the element of the shading system is locked and which is an insert part of the plastic moulded portion.

In this fixed roof element, a base for an element of a shading system is thus provided in an integrated manner so that installing the relevant shading system element is possible by simply locking it with the support component. A laborious installation of a support for the relevant element of the shading system is not required since the panel with the plastic moulded portion moulded thereto and with the support component is already designed for directly installing the element. A screwing or riveting process is not required for this. Since the position is unambiguously and precisely determined by the moulding tool in which the plastic moulded portion is moulded, the element, which is locked with the support component, can be fastened to the panel in a precise and repeatable way. Due to the support component which is already integrated at the panel and at which the relevant element of the shading system can be locked, no further frame components, screws and screw bosses have to be provided which would make it possible to install the relevant element of the shading system. The available installation space can consequently be used in an optimum way. Due to the fact that it is not necessary to provide a frame for the shading system, which would have to be installed on the inside of the panel, the panel can also be designed with a larger see-through area than usual in the state of the art. The fact that there is no frame and other fastening elements also leads to the system having a lower weight than known systems.

To be able to install the relevant element of the shading system at the support component without it producing any rattling noises, the support component preferably has a functional surface against which the element of the shading system rests. The functional surface forms a supporting surface against which at least portions of the element of the shading system rest in the locked state in a form-fitting way.

The support component preferably has a locking geometry, which corresponds to a locking counter-geometry, which is formed at the element of the shading system and into which said locking geometry reaches from below.

In order to guarantee that the support component is joined to the plastic moulded portion in a permanent and shake-free way, it can be advantageous that the support component has an anchor geometry around which the plastic moulded portion or the material of the plastic moulded portion reaches. For example, the anchor geometry is formed from ribs which have undercuts, from conically flaring pins or the like.

In a special embodiment of the fixed roof element according to the invention, the element of the shading system which is locked at the support component is a bearing unit for bearing a winding shaft, an element for centring fabric or an electronic component for controlling a drive of the shading system.

Further advantages and advantageous configurations of the subject matter of the invention are apparent from the description, from the drawing and from the claims.

BRIEF DESCRIPTIONS OF THE DRAWINGS

Exemplary embodiments of fixed roof elements according to the invention are illustrated in the drawing in a schematically simplified way and will be described in the more detail in the following description.

DETAILED DESCRIPTION

Figure 1:
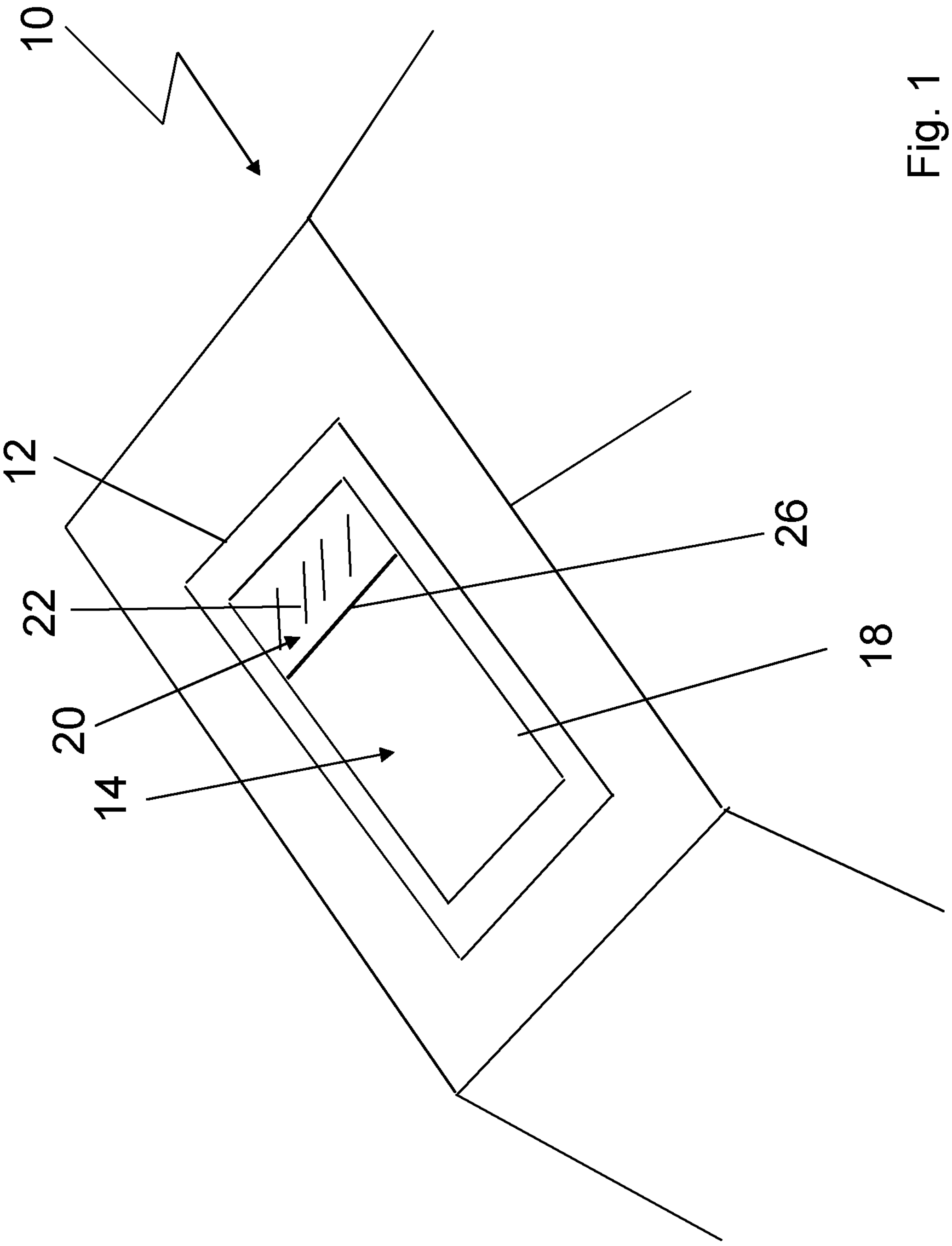
FIG. 1 shows a perspective view from above onto a vehicle roof having a fixed roof element.

In the drawing, a vehicle roof 10 is illustrated, which is realised as a fixed roof provided with a roof cutout 12, in which a fixed roof element 14 is disposed. The fixed roof element 14 is fastened in the roof cutout 12 in an immobile way with respect to a vehicle bodywork and comprises a body shell element 16, which is produced from laminated safety glass and forms an outer visible surface of the vehicle roof 10.

The fixed roof element 14 includes a substantially rectangular see-through area 18, which can be shaded by means of a shading system 20 which comprises a roof roller blind 22 as a shading element. The roof roller blind 22 is guided in a guide rail 24 on either side of a vertical longitudinal centre plane of the roof, said guide rail extending in the longitudinal direction of the roof, and can be displaced, by means of a tension bow 26, which is guided in the guide rails 24 with its ends via one slider each, between a cleared position, in which the see-through area 18 is completely cleared, and a shading position, in which the see-through area 18 is covered at least in part by the roof roller blind 22.

The shading system 20 includes a drive arrangement 28, which comprises two drive cables 30A and 30B driven by a common drive motor 32, which is joined to the underside of the body shell element 16 in the front of the see-through area 18. Each of the drive cables 30A and 30B is connected to one of the sliders of the tension bow 26, which are disposed on both sides and which are guided in the guide rails 24.

The drive motor 32 is connected to a control unit 34, which is also fastened to the underside of the body shell element 16.

The roller blind web of the roof roller blind 22 is fastened to a winding shaft 36 with its edge facing away from the tension bow 26, being wound up onto said winding shaft when clearing the see-through area 18 and being wound down from said winding shaft for shading the see-through area 18. The winding shaft 36, which is provided with a winding spring acting in the winding-up direction, is borne at a bearing unit 38 with each of its two ends, said bearing unit being fastened to the underside of the body shell element 16 at the end of the respective guide rail 24 facing away from the drive motor 32. The bearing unit 38 serves to bear the winding shaft 36 on the one hand and to centre the fabric of the roller blind web of the roof roller blind 22 on the other hand so that said roller blind web enters the relevant guide rail 24 neatly.

A plastic moulded portion 40 is formed on the underside of the body shell element 16, said plastic moulded portion 40 being produced from a polyurethane foam material. The plastic moulded portion 40 is formed to the body shell element 16 in a foam moulding tool in a foam moulding process or RIM process (Reaction Injection Moulding Process).

Figure 2:
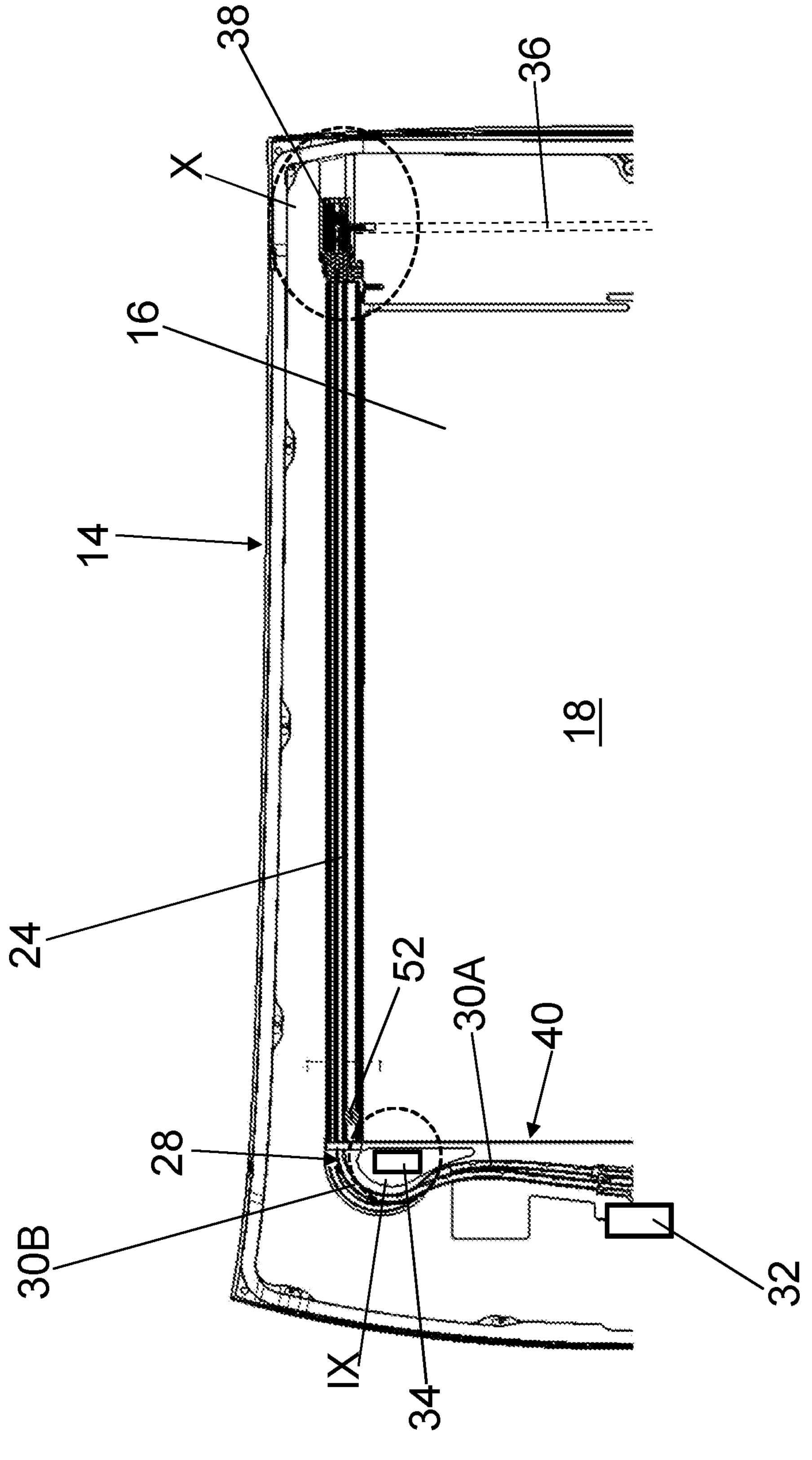
FIG. 2 shows half of a bottom view of the fixed roof element having a guide rail and a bearing element of a shading system.
Figure 3:
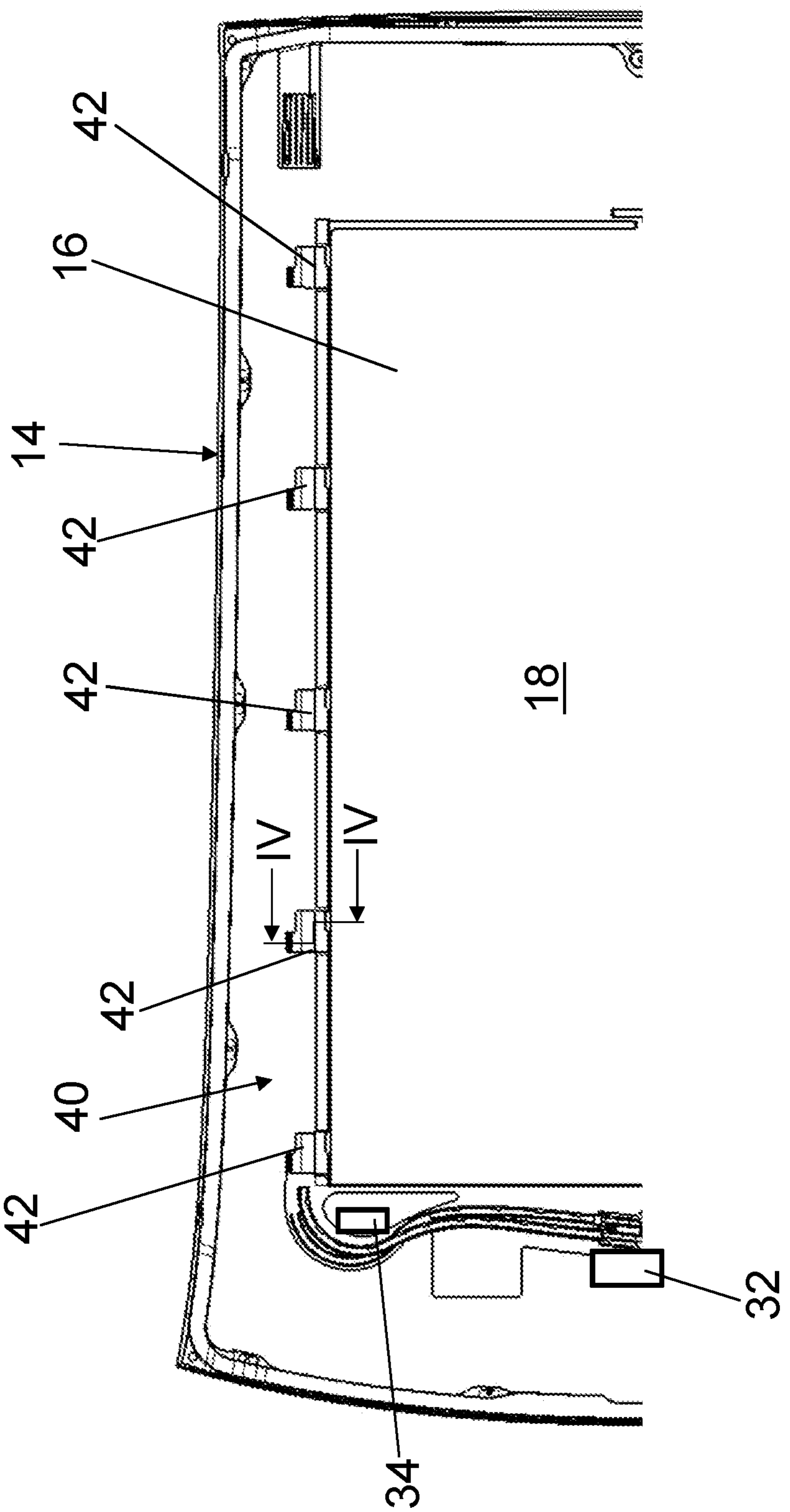
FIG. 3 shows half of a bottom view of the fixed roof element which corresponds to FIG. 2, but without a guide rail and a bearing element.
Figure 4:
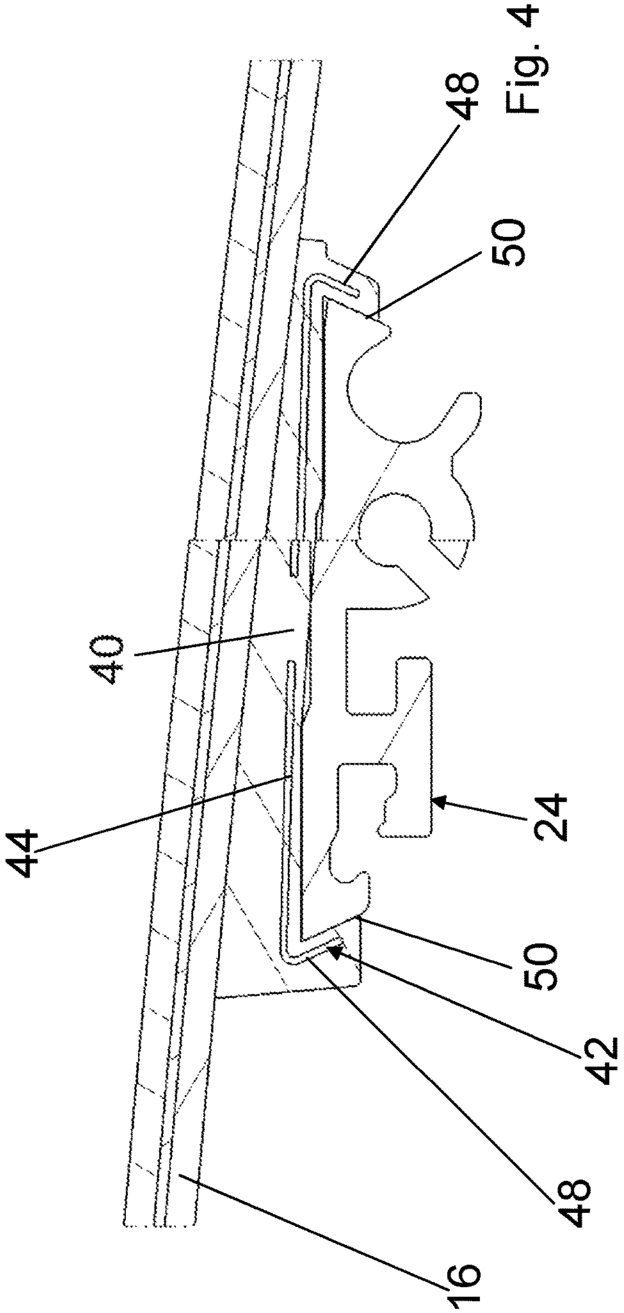
FIG. 4 shows a cross-section through the fixed roof element along line IV-IV in FIG. 3.

As FIGS. 2 to 4 show, the plastic moulded portion 40 receives five clamping elements 42 along each of the guide rails 24, the respective guide rail 24 being fastened to the underside of the body shell element 16 by means of said clamping elements 42. The clamping elements 42 together form a clamping unit, which keeps the respective guide rail 24 in a horizontal arrangement at the body shell element 16 which constitutes a panel. The clamping elements 42 reach represent an insert part of the plastic moulded portion 40.

Figure 5:
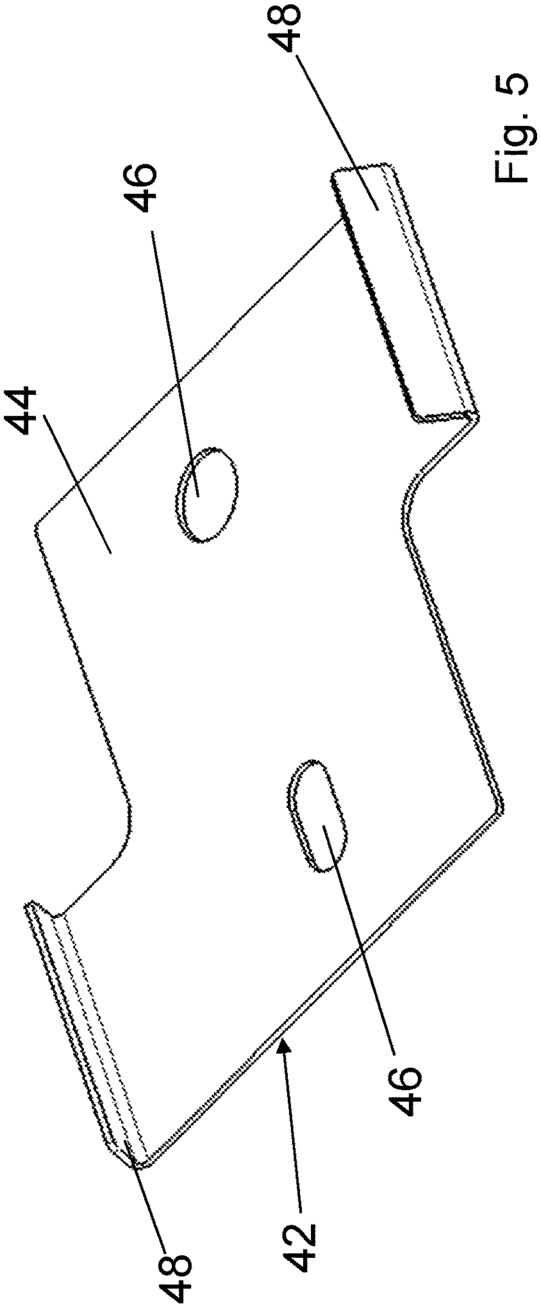
FIG. 5 shows a holding clamp for the guide rail on its own.

As FIGS. 4 and 5 show, the clamping elements 42 each comprise a substantially flat plate portion 44, which is provided with two anchor holes 46 through which the polyurethane material of the plastic moulded portion 40 reaches. The plate portion 44 merges into a resilient angled portion 48 at each of two edges extending in the longitudinal direction of the roof, said angled portions 48 engaging with a respective flank 50 of the guide rail 24 in the installed position. The angled portions 48 of a clamping element 42, which each form a tab, are offset from each other in the longitudinal direction of the guide rail 24 and each have a length of approximately 20 mm. The clamping elements 42 are in each case disposed at a distance of approximately 300 mm along the guide rail 24.

The guide rails 24 are each formed as a plastic extruded part whose course and orientation in relation to the body shell element 16 is predetermined by the clamping elements 42.

As in particular FIG. 4 shows, the guide rails 24 which include guide channels for the sliders of the tension bow 26, for the roof roller blind 22 and the respective drive cable 30A or 30B have a trapezoidal cross-section in the broadest sense, a base surface being parallel to the plate portion 44.

The plastic moulded portion 40 extends over the entire length of the respective guide rail 24 so that the guide rails 24 continuously rest against the plastic moulded portion 40 in the longitudinal direction. In order to prevent the guide rails 24 from getting out of place in the longitudinal direction inadvertently, the guide rails 24 are each fixed in a front end area by means of a screw 52. The screw 52 also constitutes a fixing unit.

Figure 7:
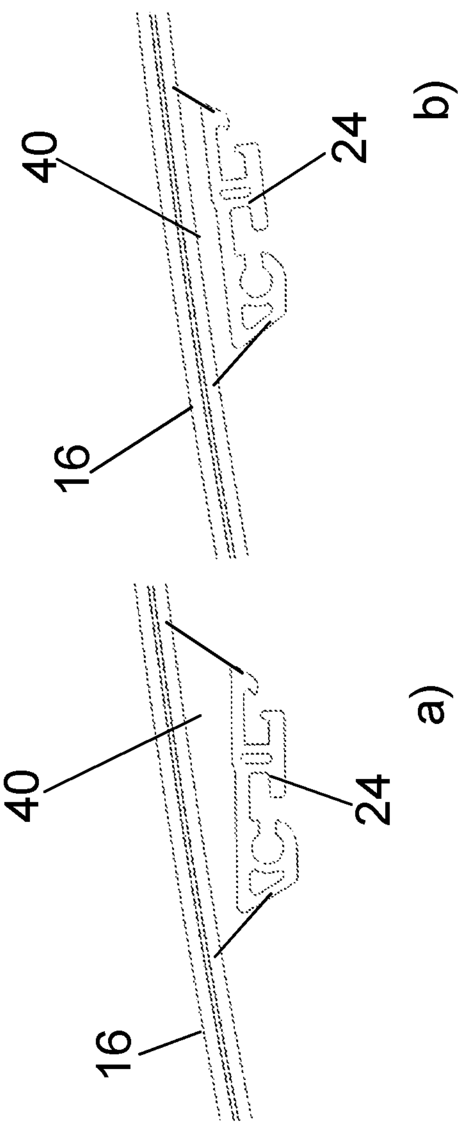
FIG. 7 shows the arrangement of a guide rail with respect to a glass element in a horizontal arrangement (a) and in a glass-parallel arrangement (b)

In the embodiment illustrated in FIG. 4, the guide rails 24 are each disposed so as to be approximately horizontal. This is also shown in FIG. 7*a*. However, in an alternative embodiment, the clamping elements 42 can also be integrated into the plastic moulded portion 40 in such a manner that the plate portions 44 are each oriented so as to be glass-parallel so that the guide rails 24, which are fixed via the clamping elements 42, also have a glass-parallel orientation, as FIG. 7*b* illustrates. Attaching the guide rails 24 in an arbitrary other angle position with respect to the body shell element 16 is also conceivable.

Figure 6:
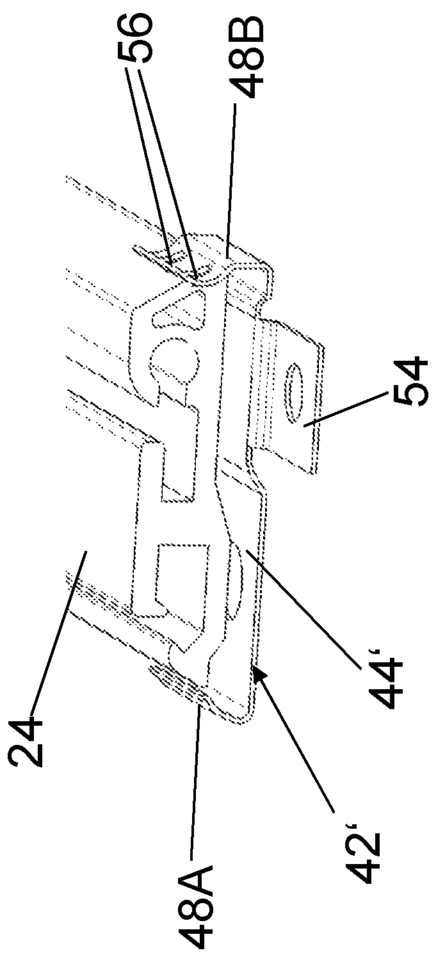
FIG. 6 shows a guide rail with an alternative embodiment of a holding clamp.

FIG. 6 illustrates an alternative clamping element 42' which can be used instead of the clamping element described above for fixing the guide rails 24 to the body shell element 16. The clamping element 42 also has a plate portion 44' which is provided with anchor tabs 54, the plastic moulded portion 40 reaching through and being moulded around said anchor tabs 54 in the installed state. At opposite edges, the clamping element 42' in each case includes a tab-like angled portion 48A or 48B, angled portion 48A being rigid and angled portion 48B being resilient and being provided with holding thorns 56, which grip into the plastic material of the respective, guide rail 24 in the installed position. Upon installation, the guide rail 24 is guided below the angled portion 48B with a flank 50 and then brought into its installed position against the plate portion 44' by way of elastic deformation of the angled portion 48B.

Figure 9:
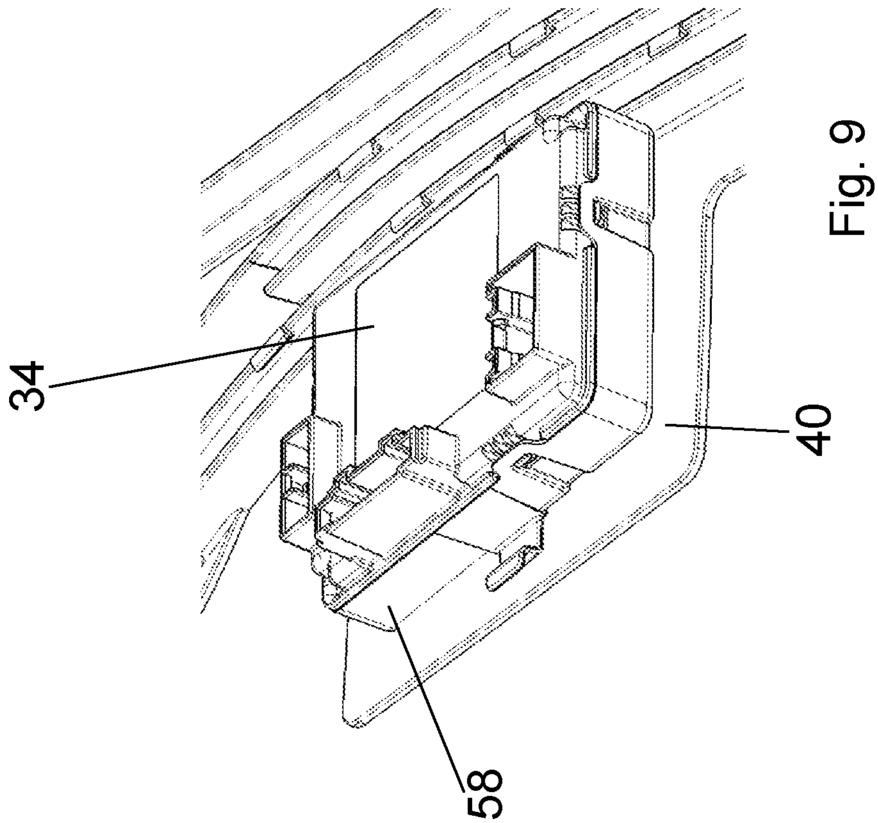
FIG. 9 shows a control of the shading system being joined in the area IX in FIG. 2.
Figure 8:
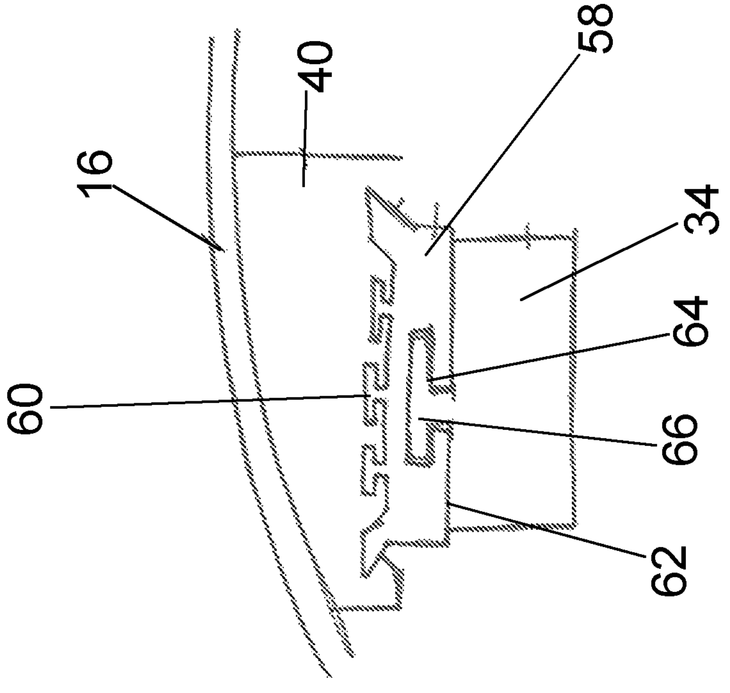
FIG. 8 shows the principle of joining a roller blind component to a glass element of a fixed roof element.
Figure 10:
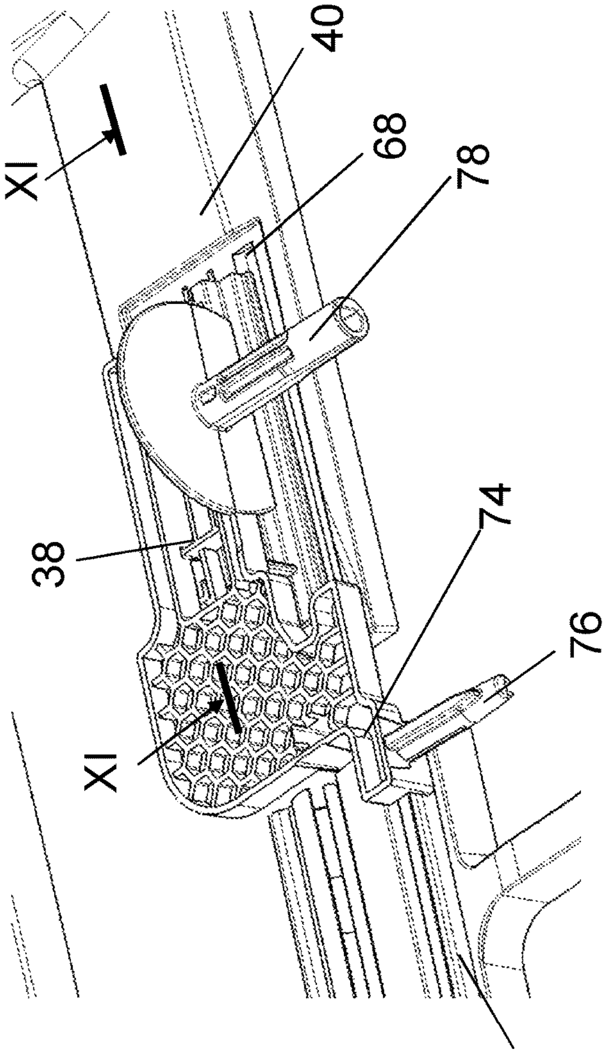
FIG. 10 shows a perspective view of the bearing system at the fixed roof element in the area X in FIG. 2.
Figure 12:
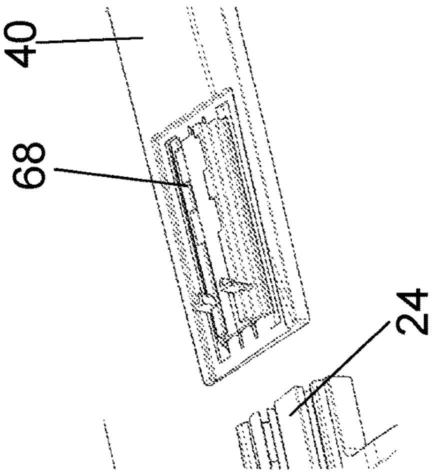
FIG. 12 shows a plastic moulded portion together with a support component for the bearing element.
Figure 13:
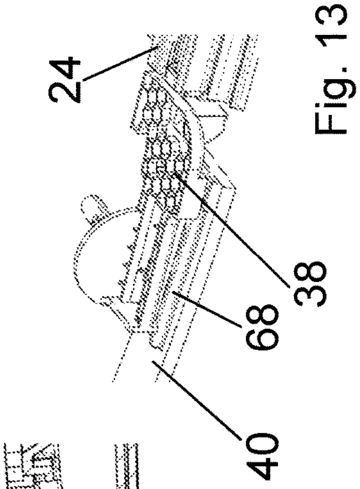
FIG. 13 shows a perspective view of the plastic moulded portion having the support component and the installed bearing element of the shading system.
Figure 11:
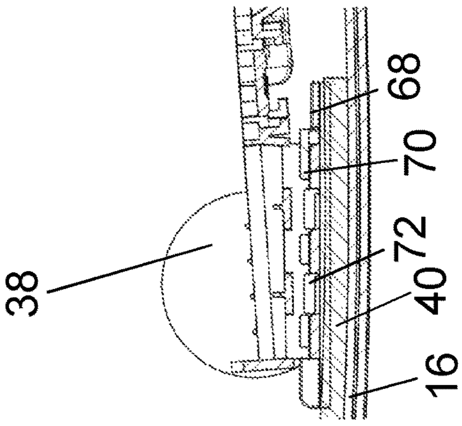
FIG. 11 shows a longitudinal cross-section through the arrangement according to FIG. 10 along line XI-XI in FIG. 10.
Figure 14:
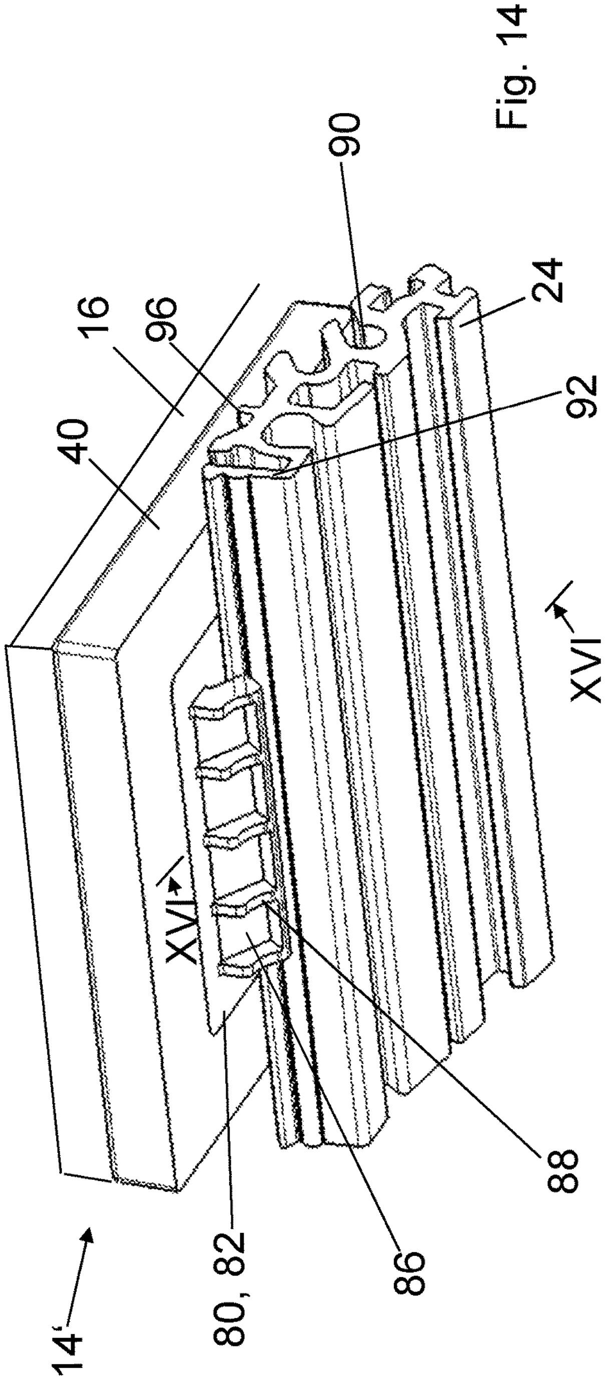
FIG. 14 shows a perspective bottom view of areas of an alternative embodiment of a fixed roof element according to the invention.
Figure 16:
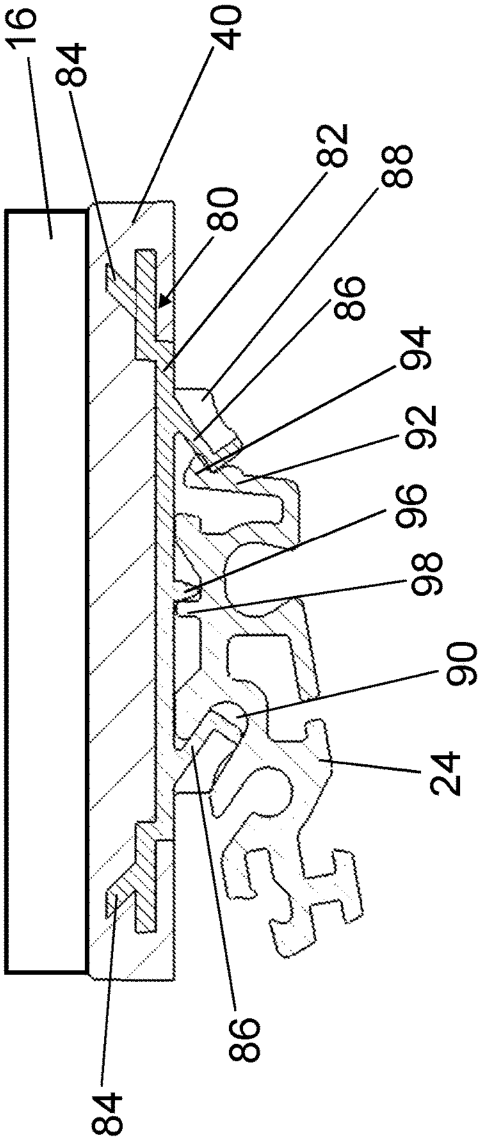
FIG. 16 shows a cross-section through the fixed roof element according to FIG. 14 along line XVI-XVI in FIG. 14.
Figure 17:
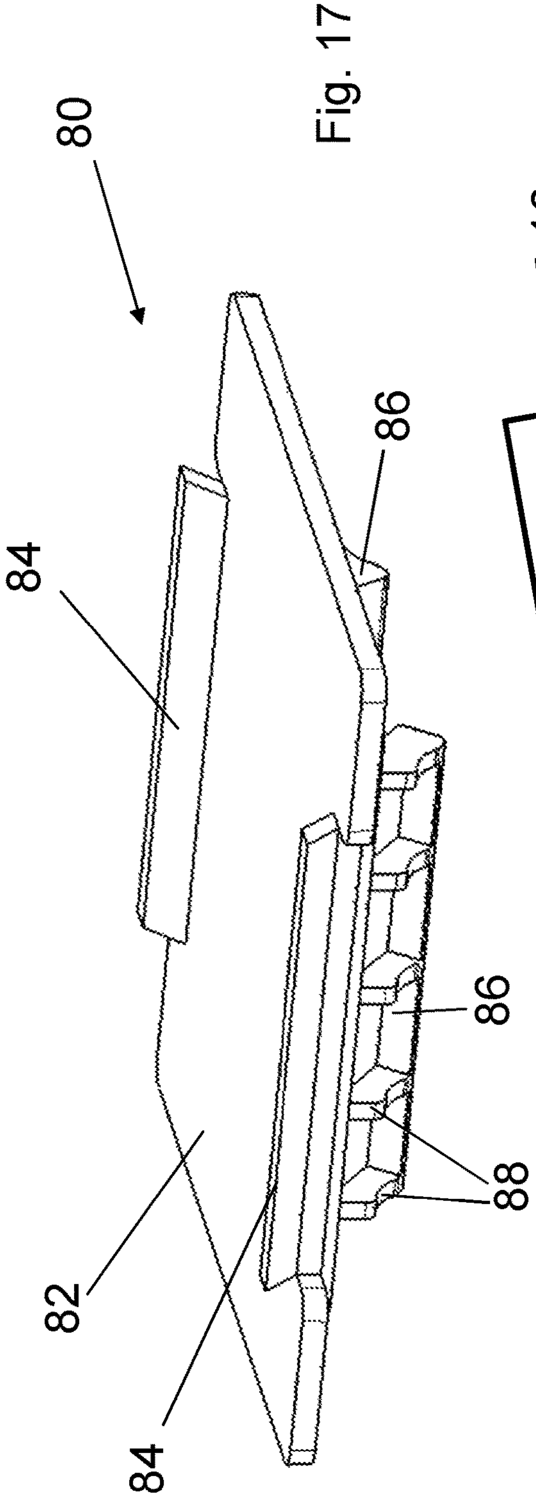
FIG. 17 shows a plastic element of a clamping unit of the fixed roof element according to FIG. 14 in a perspective illustration.
Figure 15:
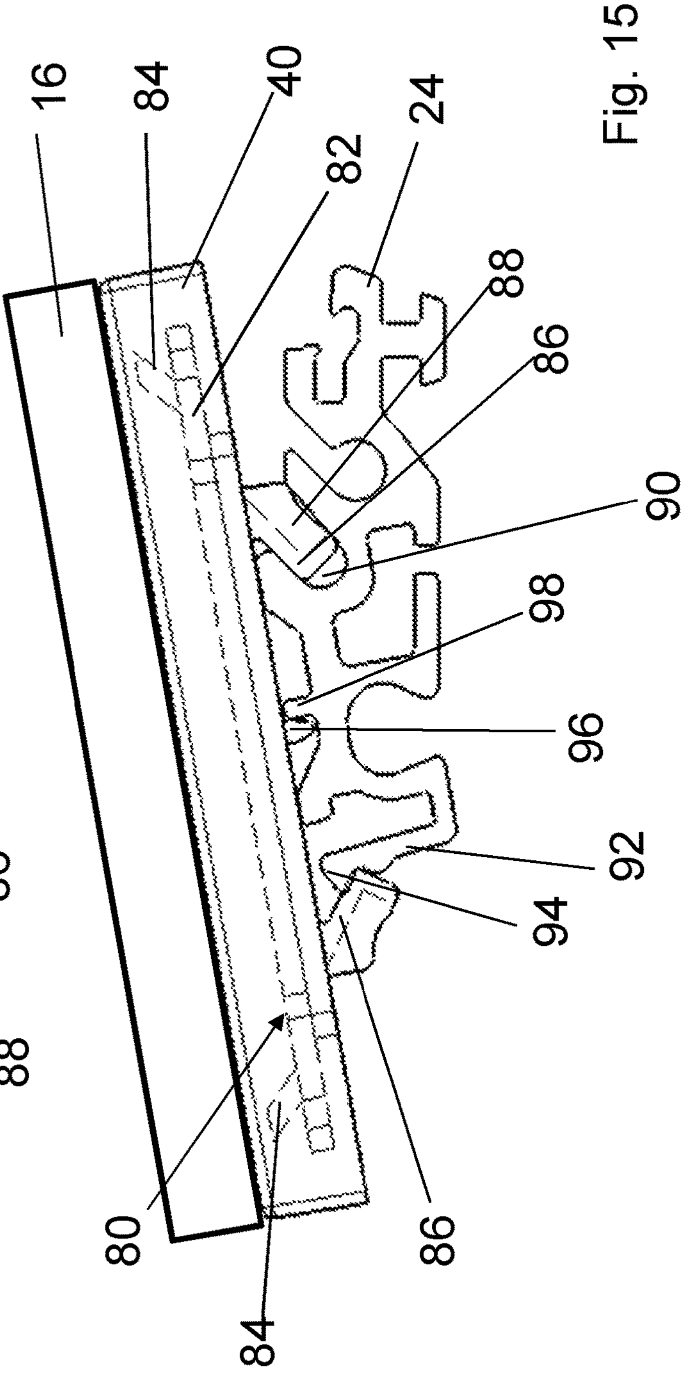
FIG. 15 shows a front view of the fixed roof element according to FIG. 14 in the area of the guide rail.

As FIG. 9 in particular shows, the control unit 34 is locked at a support component 58 which constitutes an insert part of the plastic moulded portion 40 in the area of the front edge of the see-through area 18. The schematic diagram in FIG. 8 shows that the support component 58 includes anchor ribs 60, which form undercuts and around which the polyurethane material of the plastic moulded portion 40 reaches. The support component 58 has a supporting surface 62 against which the control unit 34 rests. Furthermore, the support component 58 has a locking geometry 64, which is T-shaped in cross-section and into which a locking counter-geometry 66 of the control unit 34 engages.

As FIGS. 10 to 13 show, the bearing units 38 for the winding shaft 36 are also locked at the support component 68 which constitutes an insert part of the plastic moulded portion 40 which surrounds the see-through area 18 like a frame. The support component 68 has a locking geometry 70, into which a locking counter-geometry 72 of the respective bearing unit 38 engages so that the bearing unit 38 is joined to the underside of the body shell element 16 in a captive way. With an extension 74, the bearing units 38 are supported at the guide rail 24 respectively assigned. A pin 76 is also disposed at the extension 74 for fastening a cross member which forms a running edge for the roof roller blind 22. A pin 78 serves to bear the winding shaft 36 against the bearing unit 38.

As the above description shows, it is possible due to the reception of the support components 58 and 68 and the reception of the clamping elements 42 or 42' in the one-piece or multi-part plastic moulded portion 40 to equip the fixed roof element 14 or the body shell element 16 with the components of the shading system 20 simply and manually, namely by locking at the insert parts which are received by the plastic moulded portion 40. An additional frame for the shading system 20 is not required.

FIGS. 14 to 17 illustrate a fixed roof element 14' which is a component of a vehicle roof of the kind illustrated in FIG. 1 and is also fastened in a roof cutout in an immobile way with respect to a vehicle bodywork and includes a roof shell element 16, which is produced from laminated safety glass or a toughened safety glass and forms an outer visible surface of the vehicle roof.

Corresponding to the embodiment described above, the fixed roof element 14' also includes a substantially rectangular see-through area, which can be shaded by means of a shading system which comprises a roof roller blind as a shading element. The roof roller blind is guided in a guide rail 24 on either side of a vertical longitudinal centre plane of the roof, said guide rail 24 extending in the longitudinal direction of the roof, and can be displaced, by means of a tension bow, which is guided in the guide rails 24 with its ends via one slider each, between a cleared position, in which the see-through area is completely cleared, and a shading position, in which the see-through area is covered at least in part by the roof roller blind.

In a manner not illustrated, the shading system of the fixed roof element 14' illustrated in FIGS. 14 to 17 includes a drive arrangement, which comprises two drive cables driven by a common drive motor, which is joined to the underside of the roof shell element 16 in the front of the see-through area. Each of the drive cables is connected to one of the sliders of the tension bow, which are disposed on both sides and which are guided in the guide rails 24. The drive motor is connected to a control unit, which is also fastened to the underside of the roof shell element 16. In this respect, the fixed roof element 14' corresponds to the fixed roof element described above.

Again corresponding to the exemplary embodiment described above, the roller blind web of the roof roller blind is fastened to a winding shaft with its edge facing away from the tension bow, being wound up onto said winding shaft when clearing the see-through area and being wound down from said winding shaft for shading the see-through area.

A plastic moulded portion 40 is formed to the underside of the roof shell element 16, said plastic moulded portion 40 being produced from a polyurethane foam material. The plastic moulded portion 40 is formed to the roof shell element 16 in a foam moulding tool in a foam moulding process or RIM process (Reaction Injection Moulding Process).

Over the surface of each of the guide rails, the plastic moulded portion 40 receives multiple plastic elements 80 which are a component of a clamping unit and each form an insert part of the plastic moulded portion 40.

The plastic elements 80 each comprise a base plate 82, which can be realised like a frame or in a closed way and substantially has a plane-parallel orientation with respect to the roof shell element 16 constituting a panel. Two anchor ribs 84 are formed on the upper side of the base plate 82, said anchor ribs 84 extending in the longitudinal direction of the respective guide rail 24 and each being inclined with respect to the plane of the base plate 82 and the plastic moulded portion 40 reaching around said anchor ribs 84, the visible surface of said plastic moulded portion 40 being disposed in a flush way with the visible surface of the base plate 82. Two clamping ribs 86 are formed on the underside of the base plate 82, said clamping ribs 86 extending in the longitudinal direction of the respective guide rail 24 and also being inclined with respect to the base plate 82 and being tapered towards each other, as in particular shown by FIGS. 15 and 16.

The clamping ribs 86 are provided with stiffening ribs 88 on each of their outsides.

The clamping rib 86 which is disposed on the inside with respect to the vertical longitudinal centre plane of the vehicle roof engages with a holding channel 90 which is formed on the upper side of the guide rail 24. The clamping rib 86 which is disposed on the outside with respect to the vertical longitudinal centre plane of the vehicle roof interacts with an outer locking rib 92 of the guide rail 24, said locking rib 92 being formed by a free leg of an outer U-shaped portion of the guide rail 24 and including, at its upper end area, a projection 94, which is lug-like in cross-section and points towards the outside.

Furthermore, the plastic element 80 comprises a supporting rib 96 on the underside of the base plate 82, said supporting rib 96 extending in the longitudinal direction of the guide rail 24 and an upper counter-rib 98 of the guide rail 24 laterally resting against said supporting rib 96.

The plastic elements 80, which are assigned to the two guide rails 24 are common parts, which are each realised in a mirror-symmetrical way with respect to a centre plane, which intersects the supporting rib 96.

The invention claimed is:

1. A fixed roof element for a vehicle roof, said fixed roof element comprising:
- a panel to the underside of which at least one guide rail of a shading system is joined via a plastic moulded portion,
- wherein the plastic moulded portion receives a clamping unit, which keeps the guide rail at the panel and which is formed by at least one insert part of the plastic moulded portion, and
- wherein the clamping unit comprises a plastic element, on which clamping ribs are formed, on which the guide rail is locked.

2. The fixed roof element according to claim 1, wherein the clamping unit comprises at least one clamping element, which includes a plate portion and at least one angled portion, which is resilient and acts on a flank of the guide rail.

3. The fixed roof element according to claim 2, wherein the clamping element comprises two angled portions on opposite sides.

4. A fixed roof element for a vehicle roof, said fixed roof element comprising:
- a panel to the underside of which at least one guide rail of a shading system is joined via a plastic moulded portion,
- wherein the plastic moulded portion receives a clamping unit, which keeps the guide rail at the panel and which is formed by at least one insert part of the plastic moulded portion;
- wherein the clamping unit comprises at least one clamping element, which includes a plate portion and at least one angled portion, which is resilient and acts on a flank of the guide rail;
- wherein the clamping element comprises two angled portions on opposite sides, and
- wherein the two angled portions are offset from each other in the longitudinal direction of the guide rail.

5. The fixed roof element according to claim 2, wherein the at least one angled portion of the clamping element has a length of 10 mm to 30 mm in the longitudinal direction of the guide rail.

6. The fixed roof element according to claim 2, wherein the clamping unit comprises multiple clamping elements, which are disposed in such a way that they are spaced apart from each other in a longitudinal direction of the guide rail and which have a distance of approximately 150 mm to 300 mm between each other.

7. The fixed roof element according to claim 1, wherein the guide rail is an extruded plastic part, the course and orientation of said extruded plastic part in relation to the panel being determined by the clamping unit and said extruded plastic part being a two-component extruded plastic part.

8. The fixed roof element according to claim 1, wherein the guide rail has an at least nearly trapezoidal cross-section at least in an area of the clamping elements.

9. The fixed roof element according to claim 1, wherein the plastic moulded portion at least widely extends over a length of the guide rail and in that the guide rail rests against segments of the plastic moulded portion or continuously rests against the plastic moulded portion in the longitudinal direction.

10. The fixed roof element according to claim 1, wherein a fixing unit which keeps the guide rail in position with respect to the panel in the longitudinal direction.

11. The fixed roof element according to claim 1, wherein anchor ribs are formed on an upper side of the plastic element, said anchor ribs being embedded into the plastic moulded portion.

12. The fixed roof element according to claim 1, wherein the plastic element comprises a base plate, which has an at least substantially parallel orientation with respect to the panel.

13. The fixed roof element according to claim 1, wherein a supporting rib is formed on an underside of the base plate, an upper-side counter-rib of the guide rail resting against said supporting rib.

14. The fixed roof element according to claim 1, wherein the guide rail comprises an elastic locking rib, which interacts with the clamping unit.

15. A fixed roof element for a vehicle roof, said fixed roof element comprising:

a panel to the underside of which at least one element of a shading system is joined via a plastic moulded portion, wherein the plastic moulded portion receives a support component at which the element of the shading system is locked and which is an insert part of the plastic moulded portion; and wherein the support component has a locking geometry, into which the element of the shading system reaches from below with a locking counter-geometry.

16. The fixed roof element according to claim 15, wherein the support component has a supporting surface against which the element of the shading system rests.

17. The fixed roof element according to claim 15, wherein the support component has an anchor geometry around which the plastic moulded portion reaches.

18. The fixed roof element according to claim 15, wherein the element of the shading system is a bearing unit for bearing a winding shaft, an element for centering the fabric of a roller blind web or an electronic component for controlling a drive of the shading system.

* * * * *